United States Patent Office

2,884,308
Patented Apr. 28, 1959

2,884,308

PREPARATION OF CYANOGEN

William L. Fierce, Crystal Lake, and Walter J. Sandner, Carpentersville, Ill., assignors to The Pure Oil Company, Chicago, Ill., a corporation of Ohio No Drawing. Application June 11, 1956
Serial No. 590,391

12 Claims. (Cl. 23—151)

This invention relates to the preparation of cyanogen by reaction of hydrogen cyanide with a nitrogen oxide. This application is a continuation-in-part of our co-pending application Serial No. 553,428, filed December 16, 1955, and now abandoned.

In our co-pending appliction just referred to, there is disclosed and claimed the synthesis of cyanogen by reaction of hydrocyanic acid with a selected nitgrogen oxide at moderately elevated temperatures, either without catalyst or in the presence of lime glass as a catalyst. We have now found that the aforesaid process can be conducted at lower temperatures and that higher yields can be obtained by conducting the reaction in the presence of metals and metal compounds of groups IA, IB and IIA of the periodic table.

An object of this invention is to provide a simple process whereby cyanogen may be economically prepared from hydrogen cyanide. A further object of this invention is to prepare cyanogen from hydrogen cyanide by reaction with a nitrogen oxide or with a nitrogen oxide and oxygen. Still another object of the invention is to provide a low temperature process for obtaining high yields of cyanogen from hydrogen cyanide.

Another object is to provide a catalytic method for synthesizing cyanogen from hydrogen cyanide and a nitrogen oxide.

Other objects of the invention will manifest themselves from the following description.

In accordance with our process hydrogen cyanide and a nitrogen oxide or a mixture of an oxide of nitrogen with air of oxygen may be reacted at temperatures between approximately 150° C. and 1000° C., but preferably between 250–450° C. At lower temperatures the yield is too low to be practicable unless a catalyst of high activity is used, and at higher temperatures the selectivity of the process for (CN)₂ formation decreases rapidly. The process may be carried out at space velocities ranging from about 50–1000, and is preferably carried out at atmospheric pressure or slightly above, but sub-atmospheric as well as super-atmospheric pressures may be used. If lime glass is used as catalyst, it may be used in the form of beads of suitable size, such as beads of approximately 4 to 6 mm. diameter. The silver catalyst may be unsupported in a finely divided state, such as that precipitated in accordance with the process described in Patent No. 2,249,367, but preferably the silver or silver oxide is supported on a substantially inert carrier or one of low activity, such as corundum, alundum, silicon carbide, pumice, silica gel, diatomaceous earth, asbestos, firebrick or other aggregate material. Similarly, other catalysts are preferably used on a catalyst support such as those just mentioned. Any of the conventional methods for impregnating or coating a support with a catalyst may be used, such as precipitation of the metal or oxide from a solution with which the support is wetted, or agitation of the support with a liquid slurry of the silver metal or oxide. A suitable method for preparing a supported silver catalyst is disclosed in Patent No. 2,249,367. When using a supported catalyst, the catalyst may range from approximately 1 to 50% of the total weight of catalyst plus support. We prefer to use inert supports for the reason that active supports tend to produce undesirable by-products. However, it is within the scope of our invention to use catalyst supported on more active carriers, such as fuller's earth, pumice, silica gel and activated carbon.

The hydrogen cyanide utilizable in our process preferably is of relatively pure form, so that contamination of the desired product with products of side reactions involving impurities may be avoided. The hydrogen cyanide is utilized in gaseous form and in a mole ratio to the nitrogen oxide of approximately 20 to 1 of the former to 1 of the latter. Higher ratios of hydrogen cyanide to nitrogen dioxide permit higher space velocities and give higher yields of cyanogen based on nitrogen dioxide charged.

The nitrogen oxide may be nitrogen dioxide, nitrogen trioxide, nitrogen pentoxide, or mixtures of these, or a mixture of a lower oxide of nitrogen and oxygen. Nitric oxide has the formula NO as distinguished from nitrogen dioxide, which has the formula $NO_2$ or $N_2O_4$. Nitric oxide is formed from its elements at very high temperature and is a colorless gas a little denser than air. When brought into contact with oxygen or air it combines with oxygen to form the brownish-red fumes of nitrogen dioxide. Preferably, the nitrogen oxide utilized in our process is pure or substantially pure to avoid side reactions and contamination of desired products. In the event nitric oxide is used, it may either be premixed with air, oxygen, or a mixture of oxygen with inert gas, such as nitrogen, or the nitric oxide may be charged to the reaction zone together with air, oxygen, or mixture of oxygen and inert gas, in order that nitrogen dioxide be formed, since it is nitrogen dioxide or higher oxides which are necessary to complete the desired reaction. Preferably, the concentration of oxygen should be sufficient to react with substantially all the nitric oxide present and convert it to nitrogen dioxide.

We prefer to use a molal ratio of HCN to $NO_2$ of about 2:1 or higher in order to obtain high yields of cyanogen per pass based on nitrogen dioxide. The reaction may be represented by the following equation, but other reactions are possible:

$$2HCN + NO_2 \rightarrow (CN)_2 + H_2O + NO$$

The reaction may be carried out at temperatures above about 150° C. and below about 1000° C., but preferably between 250–450° C. Pressure may be atmospheric, sub-atmospheric or super-atmospheric and the reaction may take place in any conventional type of reaction vessel which is resistant to attack by the reactants and products, such as glass or stainless steel. The hydrogen cyanide may be premixed with the nitrogen oxide or the two reactants may be separately charged to the reaction zone. If the process is carried out in a continuous manner, the gaseous hourly space velocity for the charge gases separately or premixed is preferably between 200 and 1000, although lower or higher space velocities will give substantial yields of cyanogen.

The effluent gases from the reaction zone, containing cyanogen, may be passed to suitable fractionation and recovery equipment to separate the cyanogen from unreacted reactants, water and by-products. Recovered reactants may be recycled to the reaction zone regardless of whether the process is a continuous, semi-continuous, or batch type. In the case of a continuous operation, fresh or make-up charge gas is continuously supplied to the reaction zone to enable continuation of the reaction within the mole ratio range of reactants desired.

In order to more clearly describe our invention the following runs are set forth below in Table I. The runs were carried out by charging premixed HCN, NO$_2$ and nitrogen to a Pyrex or Vycor tube having a length of 12 inches and an outside diameter of ⅞ inch (21 mm.), a volume of 92 cc. in the heated zone, and electrically heated by a furnace containing resistance wire. The temperatures shown in Table I were those existing in the reaction space as measured by a thermocouple placed in a well in the center of the tube. The procedure followed was to bubble nitrogen through liquid hydrocyanic acid in a calibrated tube cooled by an ice-water bath. The mixture of gases was passed to a 250 cc. gas sample bomb and then to the reactor. In the table, GHSV means gaseous hourly space velocity, i.e., the gaseous volume at 77° F. and 14 p.s.i. of total charge gas fed per hour per unit volume of the reactor or catalyst bed. Each run lasted 20 minutes and the temperature recorded in the following table is the temperature at the end of the run. Selectivity is defined as the quantity of HCN which goes to form cyanogen expressed as a percentage of the total quantity of HCN converted. To obtain selectivity it is necessary to double the cyanogen yield and divide by the percent HCN consumed because each mole of HCN produces ½ mole of (CN)$_2$.

After cooling the effluent gases from the reaction to the temperature of the atmosphere (about 22° C.), samples of the cooled gases were taken and the cyanogen content of the samples was determined by means of a mass spectrometer.

The compositions of the various glass beads shown as catalysts in the foregoing table were as follows:

TABLE II

*Composition of commercial glasses*

| | Lime Glass, Percent | Lead Glass, Percent | Pyrex Glass, Percent |
|---|---|---|---|
| Silica, SiO$_2$ | 72 | 68 | 80 |
| Soda, Na$_2$O | 15 | 10 | 4 |
| Lime, CaO | 9 | 1 | |
| Magnesia, MgO | 3 | | |
| Alumina, Al$_2$O$_3$ | 1 | | 2 |
| Lead Oxide, PbO | | 15 | |
| Potash, K$_2$O | | 6 | |
| Boron Oxide, B$_2$O$_3$ | | | 14 |

The silver catalyst used in runs 36 and 37 of Table I was prepared by dissolving 25 g. of pure silver nitrate in 200 cc. of water, adding enough aqueous 10% by weight sodium hydroxide solution to the silver nitrate solution to precipitate all the silver as silver oxide, adding 10 cc. of 30% hydrogen peroxide to the resulting mixture, allowing the mixture to stand in order to settle out the solid silver oxide, decanting the supernatant liquid, washing the precipitate with water by decantation, filtering off the precipitate, washing the precipitate on a filter with twenty 50-cc. portions of 30% hydrogen peroxide, transferring the precipitate to a casserole and making a slurry therein with 75 cc. of water, adding 100 g. of 8–16 mesh corun-

TABLE I

| Run No. | Catalyst | Temp., °C. | Mole Ratio, HCN:NO$_2$ | GHSV of Charge Gas | Percent HCN consumed | Molar Yield per pass based on— | | Selectivity based on HCN |
|---|---|---|---|---|---|---|---|---|
| | | | | | | HCN | NO$_2$ | |
| 1 | None | 195 | 1.21 | 260 | | | 0.2 | |
| 2 | do | 305 | 1.34 | 266 | | | 0.5 | |
| 3 | do | 345 | 3.03 | 855 | | | 7.5 | |
| 4 | do | 410 | 1.14 | 257 | | | 1.0 | |
| 5 | do | 900 | 3.07 | 216 | 39.7 | 3.18 | 10.3 | 16.0 |
| 6 | Lead glass beads, 2.5 mm | 304 | 2.5 | 208 | | | 1.3 | |
| 7 | do | 373 | 3.0 | 213 | | | 7.2 | |
| 8 | Pyrex glass helices, ⅛" I.D. | 317 | 3.4 | 222 | | | ≤0.5 | |
| 9 | do | 417 | 3.1 | 216 | | | 1.7 | |
| 10 | Synthetic SiO$_2$.Al$_2$O$_3$ cracking catalyst, ⅛" pellets | 414 | 2.8 | 209 | | | 0.0 | |
| 11 | Activated alumina grade F-10 | 222 | 2.7 | 206 | | | 0.0 | |
| 12 | do | 305 | 3.0 | 215 | | | 0.0 | |
| 13 | do | 410 | 2.9 | 2.12 | | | 0.0 | |
| 14 | ZnSO$_4$ on 8–14 mesh pumice | 179 | 3.1 | 498 | 11.3 | 0.0 | 0.0 | 0.0 |
| 15 | do | 332 | 3.1 | 508 | 12.7 | 1.44 | 4.5 | 22.8 |
| 16 | Silica gel, 6–12 mesh | 152 | 3.0 | 213 | | | 1.8 | |
| 17 | do | 256 | 3.1 | 216 | | | 2.8 | |
| 18 | do | 322 | 2.5 | 203 | | | 8.8 | |
| 21 | Hydrofining catalyst 3% Co, 7% Mo on SiO$_2$.Al$_2$O$_3$ | 410 | 3.0 | 213 | | | 0.0 | |
| 22 | Pumice | 180 | 2.3 | 410 | | | 1.7 | |
| 23 | do | 317 | 2.6 | 410 | | | 4.0 | |
| 24 | Lime glass beads, 4 mm. di | | | | 19.6 | 6.9 | 18.1 | 70.4 |
| 25 | do | 100 | 2.6 | 238 | | | 0.0 | |
| 26 | do | 225 | 2.5 | 242 | | | 5.9 | |
| 27 | do | 233 | 3.7 | 235 | | | 10.1 | |
| 28 | do | 344 | 2.5 | 211 | | | 32.3 | |
| 29 | do | 360 | 1.2 | 245 | | | 21.8 | |
| 30 | do | 410 | 4.3 | 306 | | | 49.8 | |
| 31 | do | 415 | 3.0 | 222 | | | 59.7 | |
| 32 | do | 415 | 10.0 | 295 | | | 72.5 | |
| 33 | do | 416 | 1.7 | 237 | 51.3 | 25.8 | 43.5 | 101.0 |
| 34 | Lime glass beads, 6 mm. di | 461 | 3.2 | 218 | | | 36.6 | |
| 35 | Lime glass beads coated with boric oxide | 325 | 3.2 | 218 | | | 46.0 | |
| 36 | Ag on corundum | 415 | 3.1 | 216 | | | 1.0 | |
| 37 | do | 157 | 2.2 | 478 | 0.0 | 0.0 | 0.0 | 0.0 |
| 38 | Na$_3$PO$_4$ on pumice | 304 | 2.5 | 505 | 28.7 | 13.5 | 33.8 | 94.0 |
| 39 | do | 180 | 2.5 | 430 | 3.4 | 0.33 | 0.83 | 19.4 |
| 40 | Ca(NO$_3$)$_2$ on pumice | 350 | 3.5 | 532 | 49.8 | 17.0 | 60.3 | 68.4 |
| 41 | do | 171 | 1.9 | 425 | 11.5 | 0.61 | 1.2 | 10.6 |
| 42 | CaO on pumice | 294 | 1.5 | 385 | 29.4 | 16.4 | 24.5 | 112.0 |
| 43 | do | 168 | 2.3 | 683 | 6.5 | 0.3 | 0.75 | 10.0 |
| 44 | CaCl$_2$ on pumice | 315 | 2.7 | 713 | 47.0 | 20.3 | 59.3 | 94.4 |
| 45 | do | 191 | 2.8 | 506 | 11.5 | 2.56 | 7.25 | 44.6 |
| 46 | MgCl$_2$ on pumice | 382 | 3.1 | 498 | 77.0 | 32.6 | 99.6 | 84.8 |
| | do | 195 | 2.8 | 468 | 61.8 | 30.2 | 84.0 | 97.8 |
| 47 | do | 351 | 2.9 | 445 | 73.3 | 37.2 | 100 | 101.4 | dum and stirring thoroughly, adding 3.5 g. of barium peroxide with continued stirring, heating to near dryness with continued stirring, and drying the granular material at 115° C. for 20 hours. The catalyst then consisted of silver oxide supported on corundum.

The remaining catalysts included in the table which are supported on pumice were composed of 10% by weight of the active compounds with which the pumice had been impregnated and thereafter dried at a temperature of about 538° C.

From an examination of the data in Table I the following conclusions can be reached. The reaction does not proceed at temperatures as low as 100° C. (run 24), but does occur to a very minor extent at temperatures of about 150° C. (run 16) at a $HCN:NO_2$ mole ratio of 3:1. Reaction occurs at temperatures as high as 900° C. (run 5), and a comparison of runs 1 to 5 indicates that the higher the temperature the better the reaction proceeds. However, the mass spectrometric analysis of the products from run 5 shows that while 39.7% of the hydrocyanic acid charged is consumed, the selectivity for cyanogen based on hydrocyanic acid consumed is only 16%. It is apparent, therefore, that at temperatures as high as 900° C., the greater part of the hydrocyanic acid reacts to form products other than cyanogen.

An analysis of all the data indicates that the most favorable range of temperature is between about 200–450° C. Furthermore, the yield per pass based on the nitrogen dioxide charged tends to increase as the $HCN:NO_2$ mole ratio is increased. The effect of mole ratio is demonstrated by a comparison of runs 30, 31 and 32.

It is also apparent that glass surfaces in general do not have a catalytic effect. This is evident from a comparison of runs 2 to 4, in which no catalyst was used, with runs 6 and 7, in which lead glass beads were used. It appears that some constituent of the lead glass reduces activity for the reaction. A comparison of the runs made with lead glass beads and Pyrex glass helices on the one hand, and with lime glass beads on the other, clearly demonstrates the effectiveness of lime glass as a catalyst. It is indicated from the series of runs conducted with lime glass beads that maximum yields are obtained at about 415° C. and that lime glass is effective at temperatures as low as 225° C. In none of these runs were any of the gases recycled. It is probable that by recycling, equally high yields can be obtained at lower temperatures and lower mole ratios of hydrogen cyanide to nitrogen dioxide.

Run 35 was conducted in order to show that by coating the lime glass with a non-catalytic material (boric oxide) the lime glass was rendered ineffective. An examination of runs 36 and 37 shows that no yield of cyanogen was obtained with a silver catalyst at 157° C., but at 304° C. the yield was 33.8 mole % as compared to 0.5% obtained in run 2 with no catalyst at approximately the same temperature and a much lower space velocity. The selectivity in run 37 was 94%.

In runs 36 and 37 reported in Table I the silver oxide catalyst was not reduced prior to the beginning of the run. In the event it is desired to conduct the synthesis at temperatures below 300° C. it may be expedient to reduce the silver oxide to silver with hydrogen or carbon monoxide prior to beginning the run. Where the synthesis is conducted at temperatures of 300° C. or above, reduction to silver prior to the run may be practiced but is not necessary because at these temperatures silver oxide decomposes to silver and oxygen.

Although the specific catalyst used in runs 36 and 37 contained 13.6% by weight of silver, as previously disclosed, silver in any concentration from 100%, an unsupported catalyst, down to as low as approximately 1% on a supported catalyst may be used. The same is true for other catalysts in groups IA, IB and IIA.

In general, at space velocities of about 200 to 1000 the yield increases with rise in temperature up to about 450° C., and with increase in the mole ratio of hydrogen cyanide to nitrogen dioxide. The reaction occurs rapidly within the preferred temperature range so that space velocities as high as 2000 and as low as 50 will give acceptable yields of cyanogen.

It is apparent from an inspection of the data in Table I that lime glass beads, silver, trisodium phosphate, calcium nitrate, calcium oxide, calcium chloride and magnesium chloride were active catalysts for the cyanogen synthesis. Pumice and silica gel also were active to some extent. On the other hand, Pyrex glass, lead glass, synthetic cracking catalyst, activated alumina, hydrofining catalyst and zinc sulfate not only did not function as catalysts, but some appeared to retard the reaction.

Magnesium chloride (runs 46 and 47) was outstanding among the catalysts tested as demonstrated by the high yield and selectivity at both 195° C. and 351° C. It is apparent that by using magnesium and magnesium compounds as catalysts the reaction can be conducted at lower temperatures than required with or without other catalysts.

With the more active catalysts such as calcium chloride and magnesium chloride, the exothermicity of the reaction causes a rise in temperature. For example, in run 46 the temperature rose from 179° C. to 195° C. in 20 minutes and was still climbing at the end of the run.

Of the catalysts falling within the scope of this invention we prefer the lighter metals of group IIA, viz., beryllium, magnesium and calcium and their compounds since they appear to have the highest activity.

Because of its toxicity cyanogen has a large potential market as a fumigant. Moreover, because cyanogen upon being combusted produces the highest temperature ever reached by a chemical reactant, it has potential value as a rocket fuel when mixed with oxygen or an oxygen-liberating material. Cyanogen is also useful in the synthesis of petrochemicals in accordance with well-known cyanation techniques.

It is apparent from the foregoing description that the yield of cyanogen varies according to the temperature, gaseous hourly space velocity and mole ratio of reactants. The invention broadly encompasses the reaction of hydrogen cyanide and a nitrogen oxide at reaction temperature to produce cyanogen.

We claim:

1. A process for the preparation of cyanogen which comprises reacting hydrogen cyanide with nitrogen oxide having an oxidation state higher than nitric oxide, in a mol ratio of hydrogen cyanide to nitrogen oxide in the range of 1:1 to 20:1, at a gaseous hourly space velocity of about 50–2000, at a temperature in excess of 100° C. sufficient to effect reaction between the nitrogen oxide and hydrogen cyanide, and recovering cyanogen therefrom as the product.

2. A process in accordance with claim 1 in which the reaction is carried out in the presence of a catalyst capable of accelerating the oxidation of hydrogen cyanide by the nitrogen oxide.

3. A process for the preparation of cyanogen which comprises reacting hydrogen cyanide with a nitrogen oxide having an oxidation state higher than nitric oxide, at a temperature from about 150° to 1000° C., a mol ratio of hydrogen cyanide to nitrogen oxide in the range of 1:1 to 20:1, a gaseous hourly space velocity of about 50–2000, and recovering cyanogen therefrom as the product.

4. A process in accordance with claim 3 in which the reaction is carried out in the presence of a catalyst capable of accelerating the oxidation of hydrogen cyanide by the nitrogen oxide.

5. A process in accordance with claim 4 in which the catalyst comprises lime glass beads.

6. A process in accordance with claim 5 in which the hydrogen cyanide-nitrogen oxide mol ratio is about 2–10:1, and the reaction temperature is about 350–550° C.

7. A process in accordance with claim 6 in which hydrogen cyanide and nitrogen dioxide are reacted in a 2–10:1 mol ratio, at a temperature of about 400°–425° C.

8. A process in accordance with claim 4 in which the catalyst is pumice.

9. A process in accordance with claim 4 in which the catalyst contains a magnesium halide.

10. A process in accordance with claim 4 in which the catadlyst contains a calcium halide.

11. A process in accordance with claim 4 in which the catalyst contains calcium nitrate.

12. A process in accordance with claim 4 in which the catalyst contains calcium oxide.

References Cited in the file of this patent

UNITED STATES PATENTS

| | | |
|---|---|---|
| 747,271 | Tcherniac | Dec. 15, 1903 |
| 2,409,429 | Donovan et al. | Oct. 15, 1946 |
| 2,712,493 | Moje | July 5, 1955 |

FOREIGN PATENTS

| | | |
|---|---|---|
| 145,824 | Great Britain | June 25, 1920 |

OTHER REFERENCES

Ephraim: "Inorganic Chemistry," 4th edition (1943), pages 668 to 671. Nordeman Publishing Co., N.Y., N.Y.

UNITED STATES PATENT OFFICE
Certificate of Correction

Patent No. 2,884,308 April 28, 1959

William L. Fierce et al.

It is hereby certified that error appears in the printed specification of the above numbered patent requiring correction and that the said Letters Patent should read as corrected below.

Column 1, line 20, for "appliction" read —application—; line 45, for "of oxygen" read —or oxygen—; column 2, line 35, after "or" insert —a—; columns 3 and 4, Table I, eighth column thereof, opposite Run No. 8, under the column headed by "Molar Yield per pass based on— $NO_2$" for "$\leq 0.5$" read —$\leq 0.5$—; same Table I, fifth column thereof, opposite Run No. 13, under the heading "GHSV of Charge Gas", for "2.12" read —212—; column 7, line 4, for the claim reference numeral "6" read —5—.

Signed and sealed this 1st day of September 1959.

[SEAL]

Attest:

KARL H. AXLINE, ROBERT C. WATSON,
*Attesting Officer.* *Commissioner of Patents.*